United States Patent
Benderradji et al.

(10) Patent No.: US 10,330,021 B2
(45) Date of Patent: Jun. 25, 2019

(54) SYSTEM FOR CONTROLLING VARIABLE-PITCH VANES FOR A TURBINE ENGINE

(71) Applicant: SAFRAN AIRCRAFT ENGINES, Paris (FR)

(72) Inventors: Kamel Benderradji, Livry sur Seine (FR); Alain Marc Lucien Bromann, Vulaines sur Seine (FR); Lilian Yann Dumas, Bois le Roi (FR); Pamela Dominique Daniele Reichert, Saintry sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 527 days.

(21) Appl. No.: 14/877,270

(22) Filed: Oct. 7, 2015

(65) Prior Publication Data

US 2016/0115875 A1 Apr. 28, 2016

(30) Foreign Application Priority Data

Oct. 27, 2014 (FR) .................................. 14 60284

(51) Int. Cl.
*F01D 17/16* (2006.01)
*F02C 9/22* (2006.01)

(52) U.S. Cl.
CPC .............. *F02C 9/22* (2013.01); *F01D 17/162* (2013.01); *F01D 17/167* (2013.01)

(58) Field of Classification Search
CPC ................................. F02C 9/22; F01D 17/167
See application file for complete search history.

(56) References Cited

U.S. PATENT DOCUMENTS

| 2,842,305 | A | * | 7/1958 | Eckenfels ............. | F01D 17/162 415/147 |
| 3,303,992 | A | * | 2/1967 | Johnson ................ | F01D 17/162 415/149.4 |
| 4,363,600 | A | | 12/1982 | Thebert | |

(Continued)

FOREIGN PATENT DOCUMENTS

| FR | 2 672 083 A1 | 7/1992 |
| FR | 2 877 059 A1 | 4/2006 |
| WO | WO 2012/013909 A1 | 2/2012 |

OTHER PUBLICATIONS

French Preliminary Search Report (with written opinion) dated Jun. 17, 2015 in French Application 14 60284, filed on Oct. 27, 2014 (with English Translation of Categories of Cited Documents).

*Primary Examiner* — Kayla McCaffrey
(74) *Attorney, Agent, or Firm* — Oblon, McClelland, Maier & Neustadt, L.L.P.

(57) ABSTRACT

A system for controlling variable-pitch vanes for a turbine engine, including a control ring having an axis of revolution and, about the axis of revolution, an annular row of connecting rods for connecting the ring to the vanes, each connecting rod including a first end designed so as to be connected to one of the vanes, and a second end which is connected to an elongate shaft which is connected to s the ring. The shaft connected to each connecting rod has an axis of elongation which is inclined relative to a plane extending substantially through the axis of revolution and the connecting rod.

12 Claims, 4 Drawing Sheets

(56) References Cited

U.S. PATENT DOCUMENTS

| | | | | |
|---|---|---|---|---|
| 4,773,821 A | * | 9/1988 | Gonthier | F01D 17/162 |
| | | | | 415/150 |
| 4,826,399 A | * | 5/1989 | Perez | F01D 17/162 |
| | | | | 415/148 |
| 5,215,434 A | | 6/1993 | Greune et al. | |
| 8,714,916 B2 | * | 5/2014 | Jarrett, Jr. | F01D 17/162 |
| | | | | 415/160 |
| 2013/0129487 A1 | | 5/2013 | Colette et al. | |

* cited by examiner

SYSTEM FOR CONTROLLING VARIABLE-PITCH VANES FOR A TURBINE ENGINE

TECHNICAL FIELD

The present invention relates to a system for controlling variable-pitch vanes for a turbine engine.

PRIOR ART

The prior art includes in particular EP-B1-1 469 166 and EP-B1-1 911 985.

A stage of variable-pitch vanes comprises an annular row of variable-pitch stator vanes (also referred to as VSV, which is an acronym for Variable Stator Vanes), which are carried by an outer annular casing, generally of a compressor of the turbine engine. Each vane comprises a blade, the radially outer end of which is connected, via a plate having a substantially circular contour, to a cylindrical radial pivot which defines the axis of rotation of the vane and which is rotated in a corresponding opening of the outer casing. The radially inner end of the blade of each vane generally comprises a second cylindrical pivot which extends along the axis of rotation of the vane and is rotated in an opening in an inner casing of the compressor.

The radially outer end of the outer pivot of each vane is connected via a connecting rod to a 360° control ring which is rotated about the outer casing by cylinder actuation means or similar. The rotation of the control ring is transmitted by the connecting rods to outer pivots of the vanes and causes said vanes to turn about their axes. Each connecting rod carries a shaft which is connected to the ring by means of a ball-and-socket joint which generally comprises a portion (known as the head) which is rigidly connected to the shaft and is movable about a centre of rotation inside a stationary portion (cage) which is rigidly connected to the connecting rod.

The angular pitch of the stator vanes in a turbine engine is intended to adapt to the geometry of the compressor at the operating point thereof, and in particular to optimise the efficiency and the pumping range of said turbine engine, and to reduce the fuel consumption thereof in the different flight configurations.

Each of these vanes can be rotated about its axis between a first "open" or "fully open" position in which each vane extends substantially in parallel with the longitudinal axis of the turbine engine, and a second "closed" or "almost closed" position in which the vanes are inclined with respect to the axis of the turbine engine and thus reduce the air-flow cross section through the vane stage.

According to the "aero" angular law for controlling vanes, it is found that the movable portion of the above-mentioned ball-and-socket joint can be displaced more when the vanes are opened than when they are closed, or vice versa. Thus, the angles of displacement of the movable portion in the stationary portion are different when the vanes are opened and closed, which may generate relatively significant forces in the system. Said angles can be measured in a plane which extends through the longitudinal axis of the shaft (or the centre of rotation of the movable portion), and is substantially perpendicular to the axis of revolution of the ring.

The present invention in particular proposes a solution to this problem which is simple, effective and economical.

SUMMARY OF THE INVENTION

For this purpose, the invention proposes a system for controlling variable-pitch vanes for a turbine engine, comprising a control ring having an axis of revolution and, about said axis of revolution, an annular row of connecting rods for connecting the ring to said vanes, each connecting rod comprising a first end designed so as to be connected to one of said vanes, and a second end which is connected via a ball-and-socket joint to an elongate shaft which is connected to said ring, characterised in that the shaft connected to each connecting rod has an axis of elongation which is inclined relative to a plane containing said axis of revolution and extending substantially through said connecting rod.

The inclination of the axis of extension of the shaft carried by each connecting rod of the system may make it possible to reduce the above-mentioned forces associated with the difference between the opening and closure angles of the control law. Advantageously, the value of the angle of inclination is predetermined so as to absorb this angular difference between the opening and the closure. This inclination has a not insignificant impact on the variable-pitch kinematics and may make it possible to cause the ball-and-socket joint to function between the shaft and the connecting rod in an identical angular displacement during opening and during closure.

The system according to the invention may comprise one or more of the following features, taken in isolation from one another or in combination with one another:
- the shaft connected to each connecting rod has a portion which is mounted so as to swivel relative to the connecting rod,
- said portion of the shaft is a middle portion or a longitudinal end of the shaft,
- said portion of the shaft is engaged in a compartment of a member which is a part-sphere and which is itself mounted so as to swivel in a bush which is crimped in an opening of the connecting rod,
- the shaft connected to each connecting rod has at least one longitudinal end for connecting to the ring,
- said at least one longitudinal end of the shaft is a longitudinal end for fixing to the ring by crimping,
- said at least one longitudinal end of the shaft is a longitudinal end for engaging or fitting in the ring, preferably by means of resilient snap-in fitting,
- the two longitudinal ends of the shaft are longitudinal ends for engaging or fitting in the ring, preferably by means of resilient snap-in fitting,
- the two longitudinal ends of the shaft are beveled or chamfered so as to facilitate the engagement or fitting thereof,
- said axis is inclined in a substantially transverse plane, i.e. perpendicularly to said axis of revolution.

The present invention also relates to a variable-pitch vane stage for a turbine engine, comprising an annular row of variable-pitch vanes, each comprising a blade and a cylindrical pivot at the radially outer end thereof, the stage further comprising a system as described above, the cylindrical pivots of the vanes being connected to the first ends of the connecting rods of the system.

The present invention also relates to a turbine engine, characterised in that it comprises at least one system as described above.

DESCRIPTION OF THE FIGURES

The invention will be better understood and other details, features and advantages of the invention will become apparent from reading the following description, given by way of non-limiting example and with reference to the accompanying drawings, in which.

DETAILED DESCRIPTION

Figure 1:
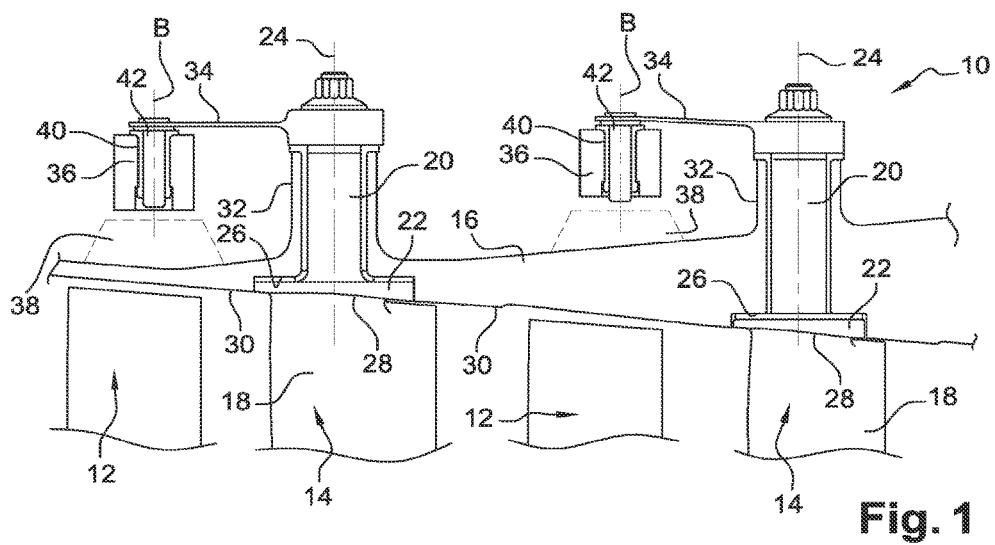
FIG. 1 is a schematic partial half view in axial section of a variable-pitch vane stage for a turbine engine according to the prior art.

FIG. 1 shows schematically, in axial section, a portion of a high-pressure compressor 10 of a turbine engine, in particular of turbojet engine of an aeroplane, having a plurality of stages, each stage comprising an annular row of rotor blades 12 carried by the rotor (not shown) of the turbine engine, and an annular row of fixed vanes 14 which form guide vane assemblies carried by a casing 16 of the stator of the turbine engine, it being possible to regulate the angular orientation of the vanes 14 in order to optimise the gas flow in the compressor 10.

Each vane 14 comprises a blade 18 and a radially outer cylindrical pivot 20 which are connected via a disc or "plate" 22 extending perpendicularly to the axis 24 of the vane in a corresponding compartment 26 of the casing 16. The radially inner surface 28 of the disc is aligned with the inner wall 30 of the casing so as not to oppose the gas flow.

The cylindrical pivot 20 of each vane 14 extends inside a radial cylindrical stack 32 of the casing 16, and the radially outer end thereof is connected via a connecting rod 34 to a control ring 36 which surrounds the casing 16 and is associated with actuation means such as an actuator (not shown) making it possible to turn said pivot in either direction about the longitudinal axis of the casing 16 so as to cause the vanes 14 of an annular row to rotate about their axes 24.

Here, the control ring 36 has an annular body which can be sectorised and formed of at least two sectors which are arranged circumferentially end-to-end and are interconnected.

The body of the ring 36 comprises radial openings 40, in which the cylindrical shafts 42 carried by the connecting rods 34 are accommodated. Each shaft 42 is, in general, centred and rotated in an opening 40 by means of at least one sleeve bearing mounted in the opening 40.

The body of the ring 36 may further comprise means for connecting to the actuator, which means may comprise, for example, a yoke carrying a spindle on which an end of a piston rod of the actuator is articulated when said actuator is a cylinder actuator for example.

In the present application, control system refers to the assembly comprising the ring 36, the connecting rods 34 and the shafts 42 for connecting the connecting rods to the ring.

The vanes 14 can be rotated about the axes 24 thereof between a closed or almost closed position and an open or fully open position.

In the closed position, the blades 18 of the vanes are inclined relative to the longitudinal axis of the turbine engine and a minimum air-flow cross section in the duct is defined between said blades. The vanes 14 are brought into this position when the turbine engine is operating at low speed or at idle speed, the flow rate of air flowing in the compressor thus having a minimum value.

In the open position, the blades 18 of the vanes extend substantially in parallel with the axis of the turbine engine, such that the air-flow cross section between the blades is at a maximum. The vanes 14 are brought into this position when the turbine engine is operating full-out, the flow rate of air flowing in the compressor thus having a maximum value.

At the outer periphery thereof, the casing 16 may comprise projecting races 38 for centring and guiding the rings 36, which races are shown schematically here by dashed lines.

In the current art, the shafts 42 are each elongate in shape and each have an axis of elongation B which is radially oriented with respect to the longitudinal axis of the compressor and which merges with the axis of revolution of the control system. In other words, the axes B of the shafts 42 all extend in planes which extend through or contain the axis of revolution of the system (the plane of the paper may be considered as a plane of this kind for FIG. 1).

It has been found that this configuration causes problems in particular when the control law of the vanes is such that the opening and closure angles are different, as will be explained in greater detail in the following, with reference to FIG. 10.

In order to resolve these problems, the present invention proposes inclining the axes of elongation of the shafts such that said axes are no longer contained in the above-mentioned planes.

Figure 2:
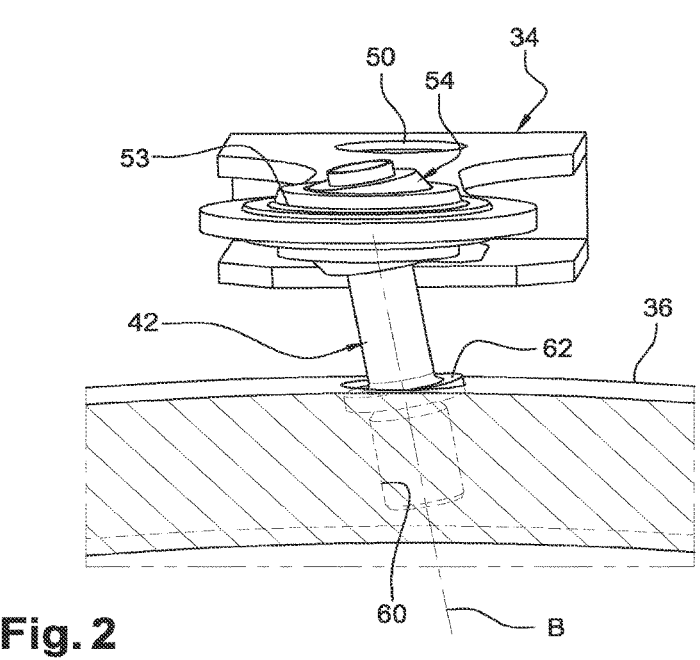
FIG. 2 is a schematic partial perspective view of a control system according to the invention.
Figure 3A:
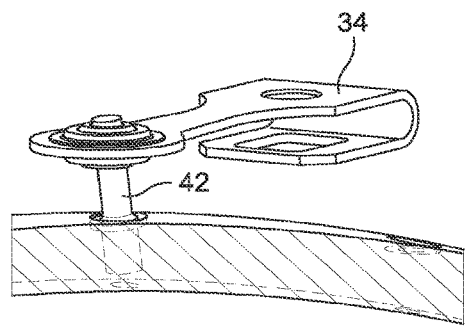
FIGS. 3a and 3b are further schematic partial perspective views of the control system of FIG. 2.
Figure 3B:
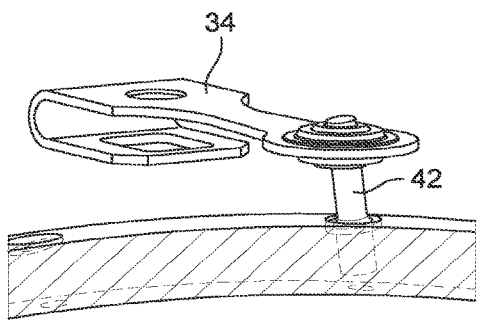

FIGS. 2, 3a and 3b show a first embodiment of the invention.

The connecting rod 34 comprises a first end for connecting to a vane 14. Here, this first end comprises an opening 50 which is designed for the pivot 20 of the vane to pass through.

The connecting rod 34 comprises a second end for connecting to the shaft 42 and, more specifically, to a radially outer end of the shaft 42. Here, this second end comprises an opening 52 in which a swiveling device is mounted, which device can be seen more clearly in FIG. 5.

The swiveling device comprises an outer bush 53 which is engaged and crimped in the opening 52 of the connecting rod and comprises a spherical inner compartment, inside which compartment a member or a head 54, which is a part-sphere, is rotatably mounted.

Figure 5:
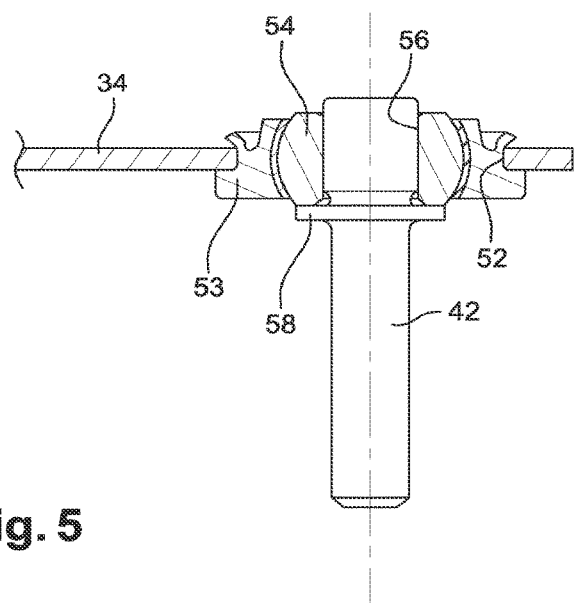
FIG. 5 is a schematic partial axial section of an end of a connecting rod of a control system according to the invention.

The head 54 comprises a cylindrical compartment 56 in which the radially outer end of the shaft 42 is engaged, which end has an outer annular collar 58 for bearing on the head (on the radially inner end thereof in the example shown in FIG. 5).

Figure 4:
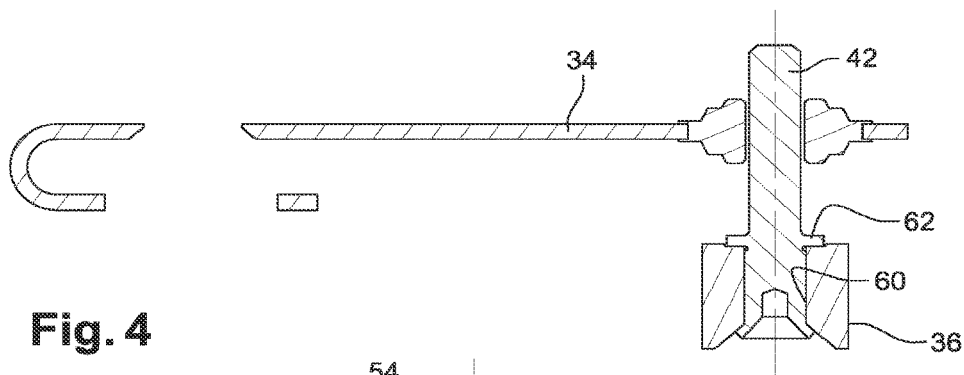
FIG. 4 is a schematic axial section of a variant of the control system according to the invention.

Here, the shaft 42 is connected to the ring 36 by the radially inner end thereof. This end of the shaft 42 is engaged in an opening 60 of the ring 36 and is preferably crimped in said opening, as shown in FIG. 4. This crimping makes it possible in particular to reduce the friction between the shaft and the ring 36.

The shaft 42 comprises a further outer annular collar 62 for bearing on the ring 36 (here on the outer periphery thereof), and the radially inner end thereof is designed so as to be able to be plastically deformed in such a way as to be able to be folded down on the ring, as shown in FIG. 4. Deforming and crimping the shaft 42 thus causes crimping of the ring 36 between the collar 62 and the deformed end of the shaft.

The ring 36 comprises a plurality of openings 60 for mounting the shafts 42 of the connecting rods. These openings 60 are inclined so as to be aligned on the axes of elongation B of the shafts 42 and thus permit the mounting thereof.

FIGS. 3a and 3b show the extreme angular positions of the connecting rod 34, i.e. the positions thereof for the maximum open and closed positions of the vanes. The inclination of the shafts 42 continues during the angular displacement of the ring 36 (in particular due to the crimping of said shafts on the ring), and is advantageously predetermined so as to absorb the angular difference between the opening and the closure relative to zero meca, and thus allows the head to function in an identical angular displacement during opening and during closure.

The axis of elongation B of the shaft 42 of each connecting rod 34 is inclined at an angle equal to the difference between the fully open position and the fully closed position. This is for example in the interval of [0°, 30°].

In the following, reference is made to FIGS. 6 to 9, which show a variant of the invention.

The connecting rod 34 is similar to that described above, and comprises a first end for connecting to a vane 14, and here comprises an opening 50 which is designed for the pivot 20 of the vane to pass through.

The connecting rod 34 comprises a second end for connecting to the shaft 42' and, more specifically, to a middle portion of the shaft 42'. Here, this second end comprises an opening 52 in which a swiveling device is mounted, which device is similar to that described with reference to FIG. 5.

The shaft 42' passes through the compartment of the head of the swiveling device (FIG. 7), and the longitudinal ends (radially inner and external respectively) thereof are fitted in openings 64 in the ring 36 by means of resilient snap-in fitting.

Figure 6:
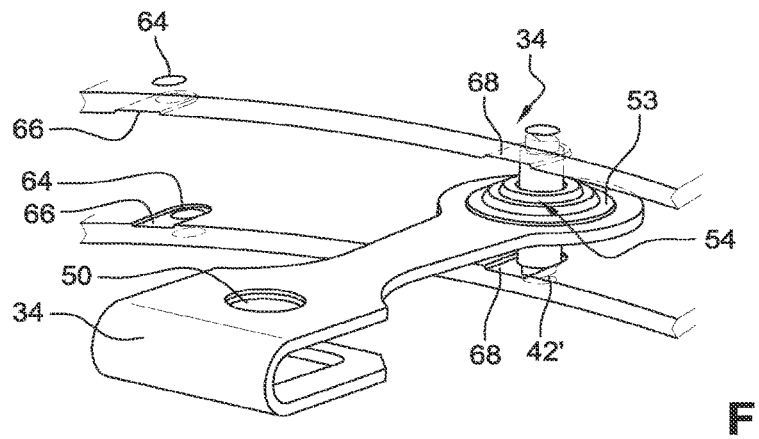
FIG. 6 is a schematic partial perspective view of a further variant of the control system according to the invention.
Figure 7:
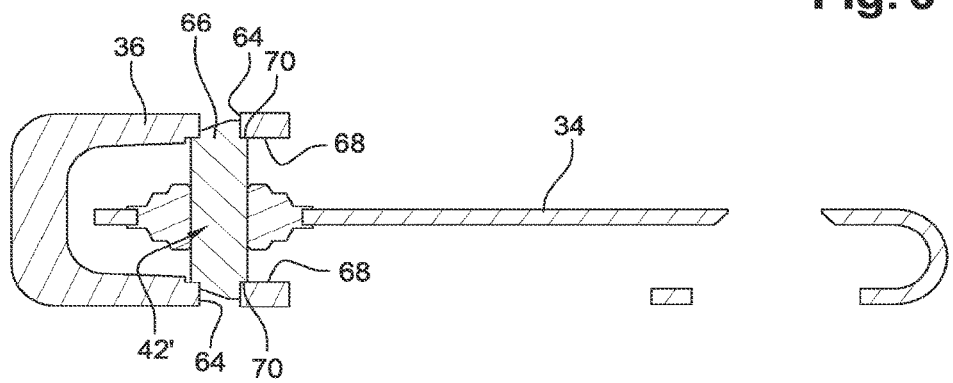
FIG. 7 is a schematic axial section of the control system of FIG. 6.

Here, the ring 36 has a substantially U-shaped cross section, the opening of which is axially oriented. The ring 36 comprises two annular walls, inner and outer respectively, between which the second end of each connecting rod 34 and the shaft 42' thereof are intended to engage (FIGS. 6 and 7).

Each longitudinal end of the shaft 42' comprises a cylindrical pin 66 for resilient snap-in fitting in one of the openings 64 of the ring. Each pin 66 has a free end which is beveled and has a slope intended to facilitate said snap-in fitting and to cooperate with a notch 68 provided on the corresponding wall of the ring. As shown in FIG. 6, said notch 68 extends between the opening 64 and the free peripheral edge of the wall. The notches 68 of the ring are substantially in parallel with and facing one another.

The bottom of each pin 66 is connected to the remainder of the shaft by an annular shoulder 70 which is intended to bear on the wall of the ring, in the above-mentioned notch 66 so as to immobilise the shaft with respect to the ring, in particular in the radial direction.

The shaft 42' is mounted in the ring 36 and the pins 66 thereof are inserted in the openings 64 in the walls of the ring by means of resilient snap-in fitting. This is made possible by the resilient deformation of the ring 36, and more specifically by the separation of the walls thereof from one another during insertion of the shaft 42' into the ring and sliding of the pins 66 into the notches 68 in the walls of the ring.

Figure 8:
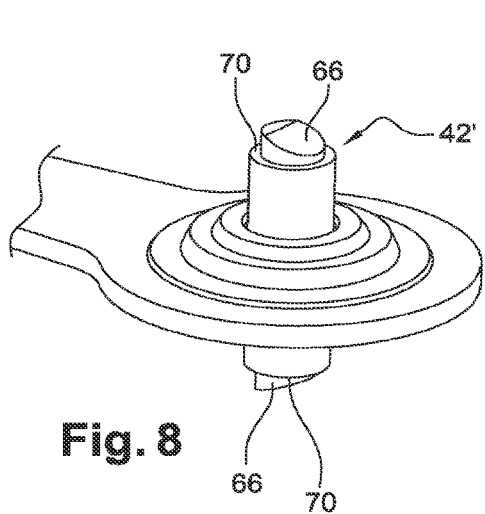
FIG. 8 is a schematic partial view in perspective of the control system of FIG. 6.

In the embodiments of FIGS. 6 to 8, the shaft 42' has an elongate shape which is substantially cylindrical and straight.

Figure 9:
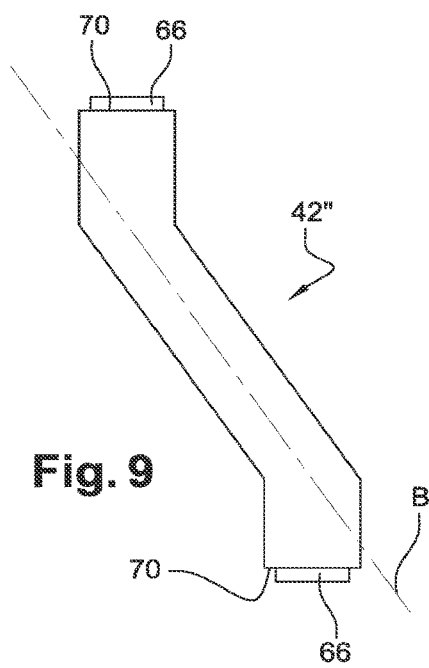
FIG. 9 is a schematic view of a shaft for a variant of the control system according to the invention.

In the variant of FIG. 9, the shaft 42" has an inclined middle portion which has an inclined axis of elongation B and is therefore according to the invention. The longitudinal ends of the shaft 42" are similar to those of the shaft 42' of FIGS. 6 to 8.

Figure 10:
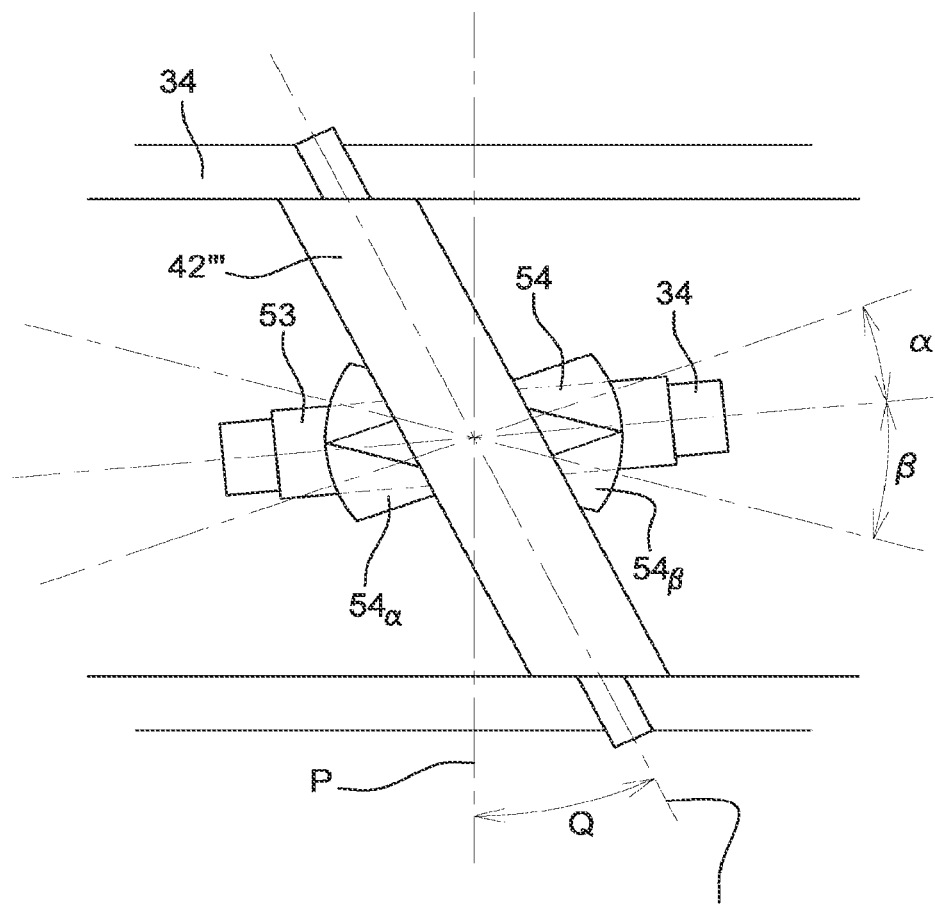
FIG. 10 is a highly schematic view showing the angle of inclination of a shaft of a control system according to the invention.

FIG. 10 shows a cylindrical shaft 42''' which is straight but inclined relative to the plane P which extends through or contains the axis of revolution of the ring 34 and through the centre of the shaft. FIG. 10 also shows the connecting rod 34 and the head thereof in three distinct positions. Reference numeral 54 denotes the head when the ring and the vanes are in an intermediate pitch position. Reference numerals 54a and 54b denote the head when the ring and the vanes are in the maximum open and maximum closed positions respectively. The angles $\alpha$ and $\beta$ represent the positioning angles of the head in the open and closed positions respectively of the vanes. These angles are measured in a plane which is perpendicular to the axis of revolution of the ring, and which is the plane of the paper in FIG. 10. In the example shown, $\beta$ would be greater than $\alpha$, and the angle Q is such that $Q=\beta-\alpha$.

The invention claimed is:

1. A system for controlling variable-pitch vanes for a turbine engine, comprising:
a control ring having an axis of revolution and, about said axis of revolution, an annular row of connecting rods for connecting the ring to said vanes, each connecting rod comprising a first end designed so as to be connected to one of said vanes, and a second end which is connected via a ball-and-socket joint to an elongate shaft which is connected to said ring,
wherein the shaft connected to each connecting rod has an axis of elongation which is inclined relative to a plane containing said axis of revolution and extending substantially through said connecting rod.

2. The system according to claim 1, wherein the shaft connected to each connecting rod has a portion which is mounted so as to swivel relative to the connecting rod.

3. The system according to claim 2, wherein said portion of the shaft is a middle portion or a longitudinal end of the shaft.

4. The system according to claim 2, wherein said portion of the shaft is engaged in a compartment of a member which is a part-sphere and which is itself mounted so as to swivel in a bush which is crimped in an opening of the connecting rod.

5. The system according to claim 1, wherein the shaft connected to each connecting rod has at least one longitudinal end for connecting to the ring.

6. The system according to claim 5, wherein said at least one longitudinal end of the shaft is a longitudinal end for engaging or fitting in the ring by resilient snap-in fitting.

7. The system according to claim 5, wherein said at least one longitudinal end of the shaft is a longitudinal end for fixing to the ring by crimping.

8. The system according to claim 5, wherein said at least one longitudinal end of the shaft is a longitudinal end for engaging or fitting in the ring.

9. The system according to claim 1, wherein the shaft includes two longitudinal ends for engaging or fitting in the ring.

10. The system according to claim 9, wherein the two longitudinal ends of the shaft are bevelled so as to facilitate the engagement or fitting thereof.

11. A variable-pitch vane stage for a turbine engine, comprising:
- an annular row of variable-pitch vanes, each comprising a blade and a cylindrical pivot at the radially outer end thereof, and
- a system according to claim 1, the cylindrical pivots of the vanes being connected to the first ends of the connecting rods of the system.

12. The system according to claim 1, wherein the shaft includes two longitudinal ends for engaging or fitting in the ring by resilient snap-in fitting.

* * * * *

UNITED STATES PATENT AND TRADEMARK OFFICE
CERTIFICATE OF CORRECTION

PATENT NO. : 10,330,021 B2
APPLICATION NO. : 14/877270
DATED : June 25, 2019
INVENTOR(S) : Kamel Benderradji et al.

Page 1 of 1

It is certified that error appears in the above-identified patent and that said Letters Patent is hereby corrected as shown below:

On the Title Page

Column 2, item (57), Abstract, Line 7, delete "s the" and insert --the--.

Signed and Sealed this
Twenty-eighth Day of January, 2020

Andrei Iancu
*Director of the United States Patent and Trademark Office*